(12) United States Patent
Baca et al.

(10) Patent No.: US 9,106,791 B2
(45) Date of Patent: Aug. 11, 2015

(54) COLLABORATIVE ENTERTAINMENT PLATFORM

(75) Inventors: Jim S Baca, Corrales, NM (US); David Stanasolovich, Albuquerque, NM (US); Mark Price, Placitas, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,375

(22) PCT Filed: Dec. 22, 2011

(86) PCT No.: PCT/US2011/066856
§ 371 (c)(1),
(2), (4) Date: Jul. 8, 2013

(87) PCT Pub. No.: WO2013/095512
PCT Pub. Date: Jun. 27, 2013

(65) Prior Publication Data
US 2014/0267563 A1    Sep. 18, 2014

(51) Int. Cl.
*H04N 7/15* (2006.01)
*H04N 21/43* (2011.01)
(Continued)

(52) U.S. Cl.
CPC ............. *H04N 7/15* (2013.01); *H04N 21/4307* (2013.01); *H04N 21/4316* (2013.01); *H04N 21/4788* (2013.01)

(58) Field of Classification Search
CPC .................... H04N 21/472; H04N 7/17318
USPC .......... 194/206; 236/94; 348/14.08, 189, 376; 705/44, 14.58; 710/305; 725/38, 116; 726/1; 382/124; 455/411; 715/810
See application file for complete search history.

(56) References Cited

U.S. PATENT DOCUMENTS

| 4,800,376 A | * | 1/1989 | Suga et al. ................. 345/1.3 |
| 5,038,301 A | * | 8/1991 | Thoma, III .................. 345/3.3 |
| 5,068,732 A | * | 11/1991 | Satoh ........................ 348/748 |

(Continued)

FOREIGN PATENT DOCUMENTS

| JP | 2000004432 A | 1/2000 |
| JP | 2002116996 A | 4/2002 |

(Continued)

OTHER PUBLICATIONS

"International Application Serial No. PCT/US2011/066856, Search Report mailed Sep. 19, 2012", 3 pgs.

(Continued)

*Primary Examiner* — Gerald Gauthier
(74) *Attorney, Agent, or Firm* — Schwegman Lundberg & Woessner, P.A.

(57) ABSTRACT

Various systems and methods for a collaborative entertainment platform are herein described. A plurality of viewing devices configured to display images to respective screens may be identified. An application control command may be received from a viewing device in the plurality of viewing devices. An environmental indication may be received from at least one viewing device in the plurality of viewing devices. Display of a video stream may be synchronized at the plurality of viewing devices, where the video stream may include results of the application control command. The environmental indication may be presented to each viewing device in the plurality of viewing devices that is not the at least one viewing device.

25 Claims, 5 Drawing Sheets

(51) Int. Cl.
*H04N 21/431* (2011.01)
*H04N 21/4788* (2011.01)

(56) References Cited

U.S. PATENT DOCUMENTS

| | | | |
|---|---|---|---|
| 5,691,741 A * | 11/1997 | Kerigan et al. | 345/698 |
| 5,910,806 A * | 6/1999 | Narui et al. | 345/536 |
| 5,948,091 A * | 9/1999 | Kerigan et al. | 710/10 |
| 6,285,397 B1 * | 9/2001 | Webb et al. | 348/189 |
| 7,475,180 B2 * | 1/2009 | Arai et al. | 710/305 |
| 8,157,078 B1 * | 4/2012 | Folk et al. | 194/206 |
| 8,593,570 B2 * | 11/2013 | Boland et al. | 348/376 |
| 8,870,087 B2 * | 10/2014 | Pienta et al. | 236/94 |
| 2008/0209075 A1 | 8/2008 | Shamma | |
| 2010/0141842 A1 | 6/2010 | Shin et al. | |
| 2010/0315553 A1 | 12/2010 | Takatsuji et al. | |
| 2012/0054793 A1 * | 3/2012 | Kang et al. | 725/38 |
| 2013/0212634 A1 * | 8/2013 | Kitazato | 725/116 |
| 2014/0007008 A1 * | 1/2014 | Baca et al. | 715/810 |
| 2014/0214673 A1 * | 7/2014 | Baca et al. | 705/44 |
| 2014/0250490 A1 * | 9/2014 | Baca et al. | 726/1 |
| 2014/0267563 A1 * | 9/2014 | Baca et al. | 348/14.08 |
| 2014/0273956 A1 * | 9/2014 | Baca et al. | 455/411 |
| 2014/0304076 A1 * | 10/2014 | Baca et al. | 705/14.58 |
| 2015/0003693 A1 * | 1/2015 | Baca et al. | 382/124 |

FOREIGN PATENT DOCUMENTS

| | | |
|---|---|---|
| JP | 2002238040 A | 8/2002 |
| JP | 2006041888 A | 2/2006 |
| JP | 2009239646 A | 10/2009 |
| JP | 2009284055 A | 12/2009 |
| JP | 05049026 B2 | 10/2012 |
| KR | 1020050071532 A | 7/2005 |
| KR | 1020090125111 A | 12/2009 |

OTHER PUBLICATIONS

"International Application Serial No. PCT/US2011/066856, Written Opinion mailed Sep. 19, 2012", 4 pgs.

"Japanese Application U.S. Appl. No. 2014-548770, Office Action mailed Jun. 2, 2015", 4 pgs.

"Korean Application U.S. Appl. No. 10-2014-7017981, Office Action mailed May 13, 2015", 5 pgs.

* cited by examiner

COLLABORATIVE ENTERTAINMENT PLATFORM

PRIORITY APPLICATION

This application is a U.S. National Stage Application under 35 U.S.C. 371 from International Application No. PCT/US2011/066856, filed Dec. 22, 2011, which is hereby incorporated by reference in its entirety.

BACKGROUND

Interacting with entertainment content over a network has become common. Such interactions may include watching movies, watching television programs, watching training videos, or editing videos, over a network (e.g., the Internet) has become more common. Generally, an individual uses a machine (e.g., a personal computer) to access and view the entertainment content. Generally, these machines may connect to one or more screens (e.g., monitors) within a relatively short distance, often within a single room.

Services that allow multiple remote parties, such as online meeting services, generally provide audio or video from one location to other participating locations. These services generally rely on a broadcast model where content is streamed from one location and the other locations present the content as it arrives. These services also generally rely on one location controlling the meeting and included content. For example, a manager at corporate headquarters will be in control of a meeting including the presentation and control of slides viewed by participating employees at other locations. Data input from all participants is generally limited to audio and video from participating locations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

People in different geographic locations (e.g., different houses) may want to share a content experience as if they are all together in the same room. For example, a family where one parent is away may want to experience movie night as if the absent parent were in the room with the rest of the family. In another example, parents may want to collaborate with an out-of-state college student in editing a graduation video. Environmental and temporal considerations may be important in creating this shared experience. For example, synchronizing the displayed content at each location and sharing participant reactions (e.g., images, voice, and content manipulations) may give each participant the sense that remote participants are in the room with them. Additional environmental sharing, such as ambient noise, lighting, etc., may further provide an immersive experience for all participants.

Existing systems, such as online meeting systems, often fail to facilitate a fulfilling shared experience. Generally these systems rely on a simple broadcast mechanism to share content. As such, differences in network access (e.g., latency or bandwidth) may result in temporal anomalies at the participating locations. These systems also generally restrict interaction with the content to a single entity and do not allow the collaborative participation of everyone involved. Further, these systems limit environmental elements of various locations to audio or video captured at the participating locations.

The present subject matter may overcome the limitations of existing systems to provide the shared experience desired by content consumers. For example, synchronizing content display, as opposed to simply broadcasting content, may allow participants to experience the same content at the same time. Also, contemporaneous sharing of environmental indications from the participating sites may provide an efficient communications mechanism to share participants' reactions to the content. Further, by allowing every participant to interact with the content application (e.g., a video player), a truly collaborative experience may be achieved.

Figure 1A:
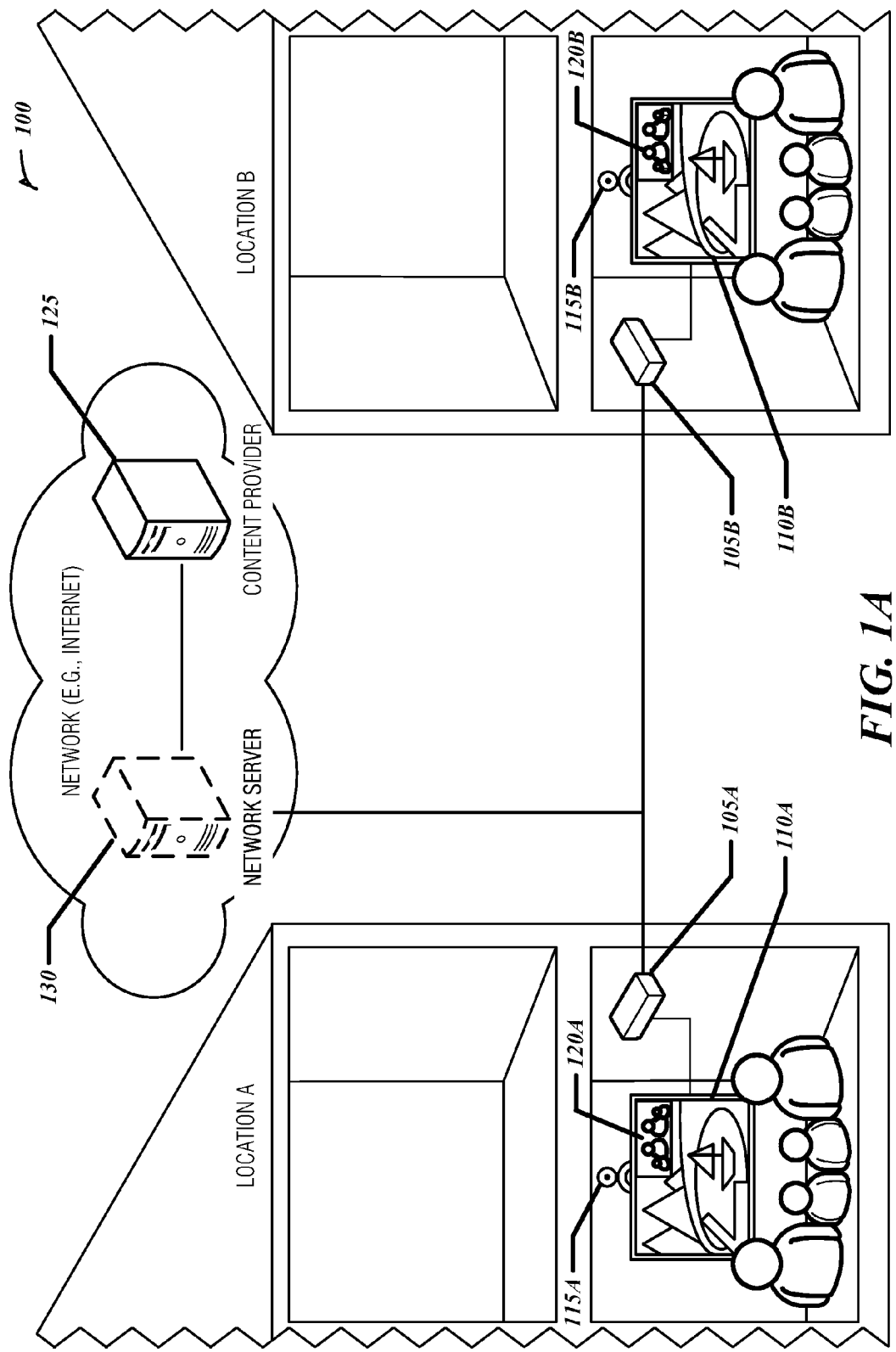
FIGS. 1A and 1B illustrate an example of a system for a collaborative entertainment platform, according to an embodiment.
Figure 1B:
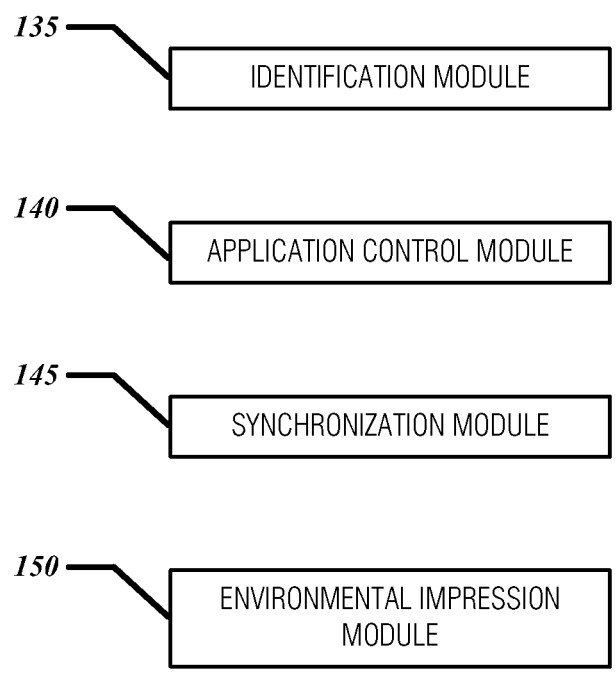

FIGS. 1A and 1B illustrate an example of a system 100 for a collaborative entertainment platform. The system 100 may include a plurality of viewing devices 105 (e.g., viewing device 105A and viewing device 105B) configured to display images to their respective screens 110 (e.g., screen 110A and screen 110B). The plurality of viewing devices 105 may be heterogeneous or homogeneous. For example, the viewing device 105A may be a digital video recorder (DVR) and the viewing device 105B may be a laptop computer or both the viewing device 105A and the viewing device 105B may be set-top boxes configured to stream content from the network.

The system 100 may also include a content provider 125, such as an online streaming service. In an example, the system 100 may include an optional network server 130. In an example, the plurality of viewing devices 105 may be communicatively coupled (e.g., via a hardwired or wireless connection using peer-to-peer or other network) to each other. In an example, the plurality of viewing devices may be communicatively coupled to the network server 130. In an example, the plurality of viewing devices 105 may be connected via the network sever 130. In an example, the plurality of viewing devices 105 may be communicatively coupled directly to the content provider 125. In an example, the plurality of viewing devices 105 may be connected to the content provider 125 via the network server 130.

The system 100 may include one or more of an identification module 135, an application control module 140, a synchronization module 145, and an environmental impression module 150 as illustrated in FIG. 1B. These modules may be included in one or more of the plurality of viewing devices 105 or the network server 130.

The identification module 135 may be configured to identify the plurality of viewing devices 105. In an example, the identification module 135 may be configured to receive a user selection of a location, a group of locations, a person, or a group of people. The identification module 135 may be configured to use this selection as the basis for identifying the plurality of viewing devices 105. For example, a user may browse an address book and select "immediate family members" via a user interface. The identification module 135 may be configured to then query a database to determine what viewing devices 105 are associated with this selection. In this way, users may quickly and easily include (e.g., connect with) desired participants. In an example, where the identification module 135 is included in a viewing device 105A, the identification module 135 may be configured to store address data (e.g., the address book) including the plurality of viewing devices 105. In an example, the identification module 135 on the viewing device 105A may query a second identification module 135 included in another viewing device 105B, or included in the network sever 130, for the address data to present to the user or to determine participants from the user selection. In an example, the identification module 135 may be configured to query an external source, such as a social networking site, to identify participants (e.g., based on a local stored set of criteria) or participant viewing devices.

The application control module 140 may be configured to receive and apply an application control command from a viewing device 105A in the plurality of viewing devices. Example applications, controlled by the application control module, may include a video player, a video editor, and a web browser. In an example, the application control command is the selection of an application. In an example, the application control module 135 may be configured to provide application controls for the application to the user via a user interface presented on the screen 105A. The user may interact with the controls using an input device, such as a remote control, a keyboard, etc. The application control module 135 may receive inputs from the input device and apply them to the application. In an example, the application control module 140 may be configured to contemporaneously receive application control commands from multiple sources and coordinate applying those application control commands. For example, participants at both viewing device 105A and 105B may select content to view. Application control modules 140 at each of these viewing devices may communicate the respective participants' application control command selections to each other and decide, for example, which participant selected a movie first. In an example, the application control module 140 may be configured to display a remote participant's actions on the local screen 110A. In an example, color coding may be used to different between different locations. For example, participants interacting with viewing device 105A may be assigned the color red and participants interacting with viewing device 105B may be assigned the color blue. Representations of these interactions, such as a pointer or highlight border around menu items, may be displayed in these colors. In an example, other differentiators may be used, such as different shapes (e.g., different looking pointers, or borders with a different corner design or line design) or visual effects such as transparency, shadow, etc.

In an example, the application control command is a selection of a video stream (e.g., a movie, television program, etc.). For example, participants may be presented with a list of movies and select one for viewing. In an example the application control command is a video stream control operation. In an example, the video stream control operation is selected from the group of "play", "pause", "stop", "rewind", "skip-rewind", "fast-forward", and "skip fast-forward". In this way, all participants may control the movie. In an example, the video stream is provided by a third-party, such as an online retailer. In an example, the network server 130 may be configured to receive the video stream provided by a third-party and provide the video stream to the plurality of viewing devices.

In an example, the application control command is a video editing control operation. In an example, the video editing control operation is the selection of a video clip. In example, the video editing control operation is the identification of a portion of video to be cut. In an example, the video editing control operation is the identification and application of an effect, filter, or other manipulation to a selected segment of video. In an example, the video editing control operation is the application of one or more meta-data to a portion, or the entire, video. In an example, the video editing control operation is the identification of a video splice video clip and a portion of the video in which the splice video clip is to be applied. In an example, the video editing control operation is the saving of the video. Video editing control operations may be combined to collaboratively create video content. For example, parents in a first state may select a graduation video. Their out-of-state college student may select moments from the video to cut, or add text bubbles above friends. The completed video may then be saved for later viewing or sharing with other people.

In an example, the application control command is a browser control operation. For example, the selection of a universal resource locator (URL), "forward," "back," clicking on links, and other operations associated with a web browser. In an example, the browser control operation may be initiated from a non-browser application. For example, while watching a science fiction movie a participant may select (e.g., using a remote control) a spaceship that appears in a scene. This selection may initiate the "pause" video stream control operation and select a URL browser control operation. The browser may be launched to retrieve and display the content at the URL, such as an online encyclopedia page providing background information about the spaceship.

The synchronization module 145 may be configured to synchronize display of a video stream at the plurality of viewing devices. In an example, the synchronization module 145 resides completely on one or more of the plurality of viewing devices 105. The video stream may include the results of the application control command. For example, when the application control command is "play," the video stream may be displayed at the screens 110. In an example, synchronizing display of the video stream may include presenting the video stream on each of screens 110A and 110B such that participants perceive simultaneous, or near simultaneous, display of the video content.

In an example, the synchronization module 145 may determine operating conditions at each viewing device 105A and 105B. Example operating conditions may include the bandwidth or latency of the viewing device's network connection, the buffer size on the viewing device 105, processing capabilities of the viewing device 105, screen 110 resolution, and output types of the viewing device 105. The synchronization module 145 may be configured to adjust the display of the video content based on one or more of these operating conditions to maintain a synchronized viewing experience. For example, if viewing device 105A has a higher resolution display than viewing device 105B, the synchronization module 145 may be configured to reduce the resolution of the video content to viewing device 105A.

In an example, to synchronize the display of a video stream at the plurality of viewing devices 105, the synchronization module 145 may be configured to determine an individual buffer length for each of the plurality of viewing devices 105 based on respective network characteristics. The network characteristics may be a subset of the operating conditions. The synchronization module 145 may also be configured to control the plurality of viewing devices 105 to refrain from displaying the video stream until a buffer for a viewing device 105A with the longest buffer length has reached a display threshold. The display threshold is a metric (e.g., percent filled, number of bits, etc.) for the buffer. When the buffer is filled up to, or past, this metric, then the display threshold has been reached. When the display threshold is reached, the viewing device 105 will be able to display uninterrupted video for a period of time. For example, a movie will not be displayed on the screen 110B until the viewing device 105A's buffer is full enough to allow uninterrupted display of the video content. In an example, the synchronization module 145 may be configured to implement other synchronization techniques. For example, the synchronization module 145 may be configured to synchronize clocks on the plurality of viewing devices 105. The synchronization module 145 may also time stamp, or otherwise indicate, in the video content what portions of the video content should be displayed at what times. By implementing one or more of these synchronization techniques, the synchronization module 145 may ensure that temporal differences in display the video content at the various locations are eliminated.

The environmental impression module 150 may be configured to receive an environmental indication from at least one viewing device 105A in the plurality of viewing devices 105. The environmental impression module 150 may also be configured to present the environmental indication to each viewing device 105B in the plurality of viewing devices 105 that is not the at least one viewing device 105A. For example, a microphone at location A may capture a family's conversation while watching a movie. This conversation may be transmitted to location B where it is presented to the absent parent. For example, an environmental indication, such as an image of the family at location A, may be presented to the absent parent at location B in a presented environmental indication 120B. Similarly, an image of the absent parent may be presented at location A as a presented environmental indication 120A.

An environmental indication may include images, video, sound, and other measurable aspects of a location, such as temperature, geographic coordinates, etc. In an example environmental indication is at least one image representing the environment of the respective screen 110A to the at least one viewing device 105A. In an example, the system 100 may include a camera 115A communicatively coupled to the at least one viewing device 105A and positioned to capture viewers of the respective screen 110A. The image representing the environmental indication may be derived from the camera 115A. Examples of presented environmental indications are discussed below with respect to FIGS. 2 and 3.

In an example, the camera 115A may include a microphone or other sensing devices. In an example, the environmental indication is an audible representation of the environment of the respective screen 110A to the at least one viewing device 105A. In an example, the environmental impression module 105 is configured to integrate the audible representation into an audio stream of the video stream. For example, as the movie is playing, the absent parent at location B may comment that she likes the hairstyle of the lead actor in a scene. This comment may be added to (e.g., layered over) the movie's sound track as the movie is presented on screen 110A. In an example, the comment (e.g., the raw audio data containing the comment) may be modified to create the audio representation. This may be done to reduce the impact on video content's audio. In an example, the raw captured audio may be modified to simulate whispering. In an example, the raw captured audio may be filtered to remove ambient noise and clarify a speaker's voice. In an example, the filtered ambient noise may be modified to reduce its volume or pitch such that it is still presented but its impact is reduced in relation to a speaker's voice.

Presenting the environmental indication with temporally synchronized content may provide an immersive experience that allows participants to feel like they are in the same room together. Shared control of the application furthers this perception by simulating physical presence of remote parties, such as through the use of a remote control and a television set.

Figure 2:
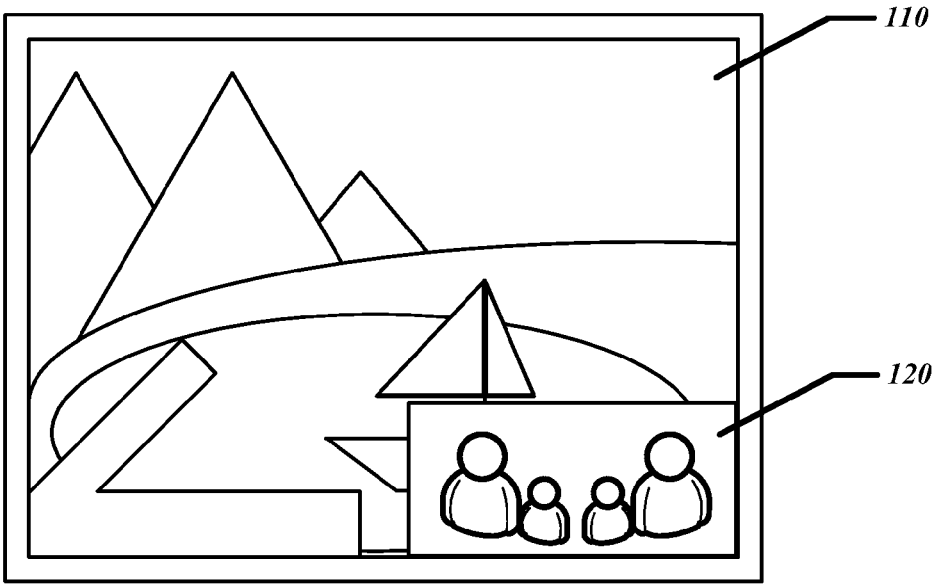
FIG. 2 illustrates an example of a screen to display synchronized content with an environmental indication, according to an embodiment.
Figure 3:
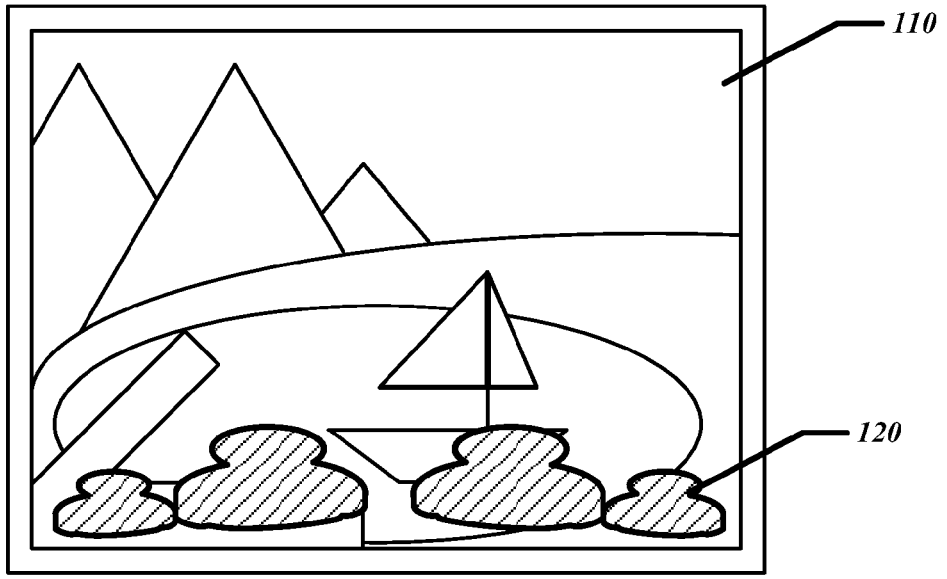
FIG. 3 illustrates an example of a screen to display synchronized content with an environmental indication, according to an embodiment.

FIGS. 2 and 3 illustrate examples of presented environmental indications 120 to participants to a collaborative entertainment system.

FIG. 2 illustrates an example of a screen 110 to display synchronized content with a presented environmental indication 120. In this example, the environmental impression module 150 is configured to present the at least one image, captured from the camera 115, in a picture-in-picture format. The presented environmental indication 120 may include an unaltered image in the display area of the picture-in-picture box. In an example, the picture-in-picture box may be placed in any location of the screen 110. In an example, the picture-in-picture box may be moved by local participants. In an example, the presented environmental indication 120 may include a stylized version of the captured image. For example, the stylized version may include avatars of participants. In an example, the stylized version may include a rear-perspective of the participants. For example, the backs of participants' heads may be simulated and placed within the image to overlay their captured faces. This may provide the impression that the viewer of the presented environmental indication 120 is sitting behind the participants that the remote location. In an example, the stylized version of the captured image may include filtering and presenting only the faces, or persons captured in the image, and suppressing, shadowing, or removing aspects of the room such as furniture. Any combination of these techniques may be applied to further the perception that remote participants are together in one place.

FIG. 3 illustrates an example of a screen 110 to display synchronized content with a presented environmental indication 120. In this example, the environmental impression module may be configured to super-impose the presented environmental indication 120 onto the video stream. The environmental indication may be modified in one or any of the ways described above with respect to FIG. 2. In an example, the presented environmental indication 120 may be modified to reduce the impact of presenting the environmental indication on the video stream. For example, the presented environmental indication 120 may include only the outline of the remote participants. In an example, the image may be assigned a transparency level (e.g., fifty percent transparent) such that the video stream is still discernible under the presented environmental indication. In an example, the presented environmental indication may simulate a reflection on the screen 110. For example, the captured image may be made mostly transparent, outlines of the remote participants may be enhanced, and those outlines may be shaded to reflect the color temperature of the local environment.

Figure 4:
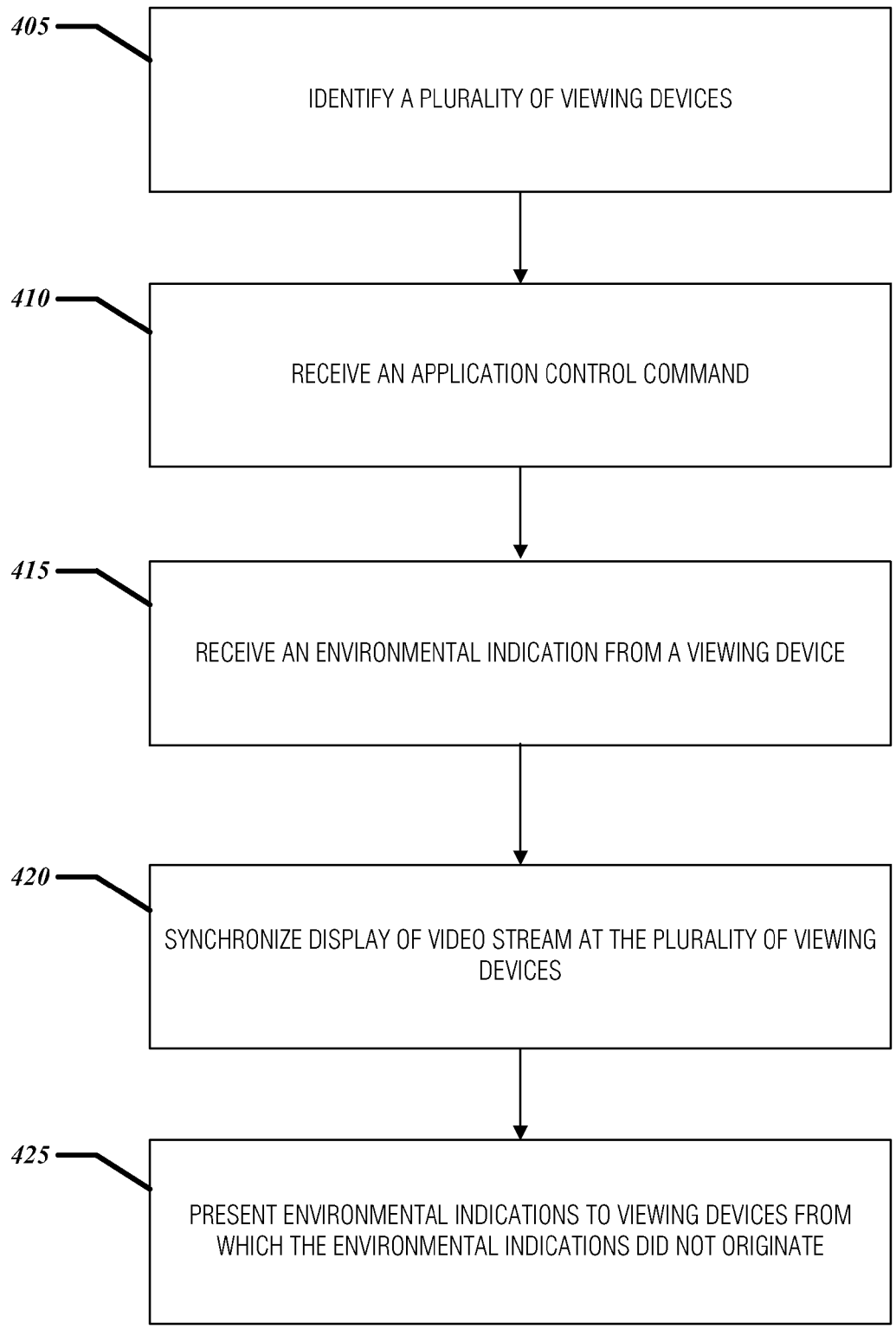
FIG. 4 is a flowchart illustrating an example of a method to implement a collaborative entertainment platform, according to an embodiment.

FIG. 4 is a flowchart illustrating an example of a method 400 to implement a collaborative entertainment platform. Any of the elements described above with respect to FIGS. 1-3 may be used, in any combination, to implement the operations of method 400.

At operation 405, a plurality of viewing devices 105 configured to display images to respective screens 110 may be identified.

At operation 410, an application control command may be received from a viewing device 105A in the plurality of viewing devices 105. In an example, the application control command is a selection of the video stream. In an example, the application control command is a video stream control operation. In an example, the video stream control operation may be selected from the group of "play", "pause", "stop", "rewind", "skip-rewind", "fast-forward", and "skip fast-forward". In an example, the application control command is a video editing control operation, such as those described above with respect to FIG. 1.

At operation 415, an environmental indication may be received from at least one viewing device 105B in the plurality of viewing devices 105. In an example, the environmental indication is at least one image representing the environment of the respective screen 110B to the at least one viewing device 105B. In an example, the at least one image may be derived from a camera 115B positioned to capture viewers of the respective screen 110B. In an example, the environmental indication may be an audible representation of the environment of the respective screen 105B to the at least one viewing device 110B.

At operation 420, display of a video stream may be synchronized at the plurality of viewing devices 105. The video stream may include results of the application control command For example, the video stream may include a playing movie when the application control command was a "play" video stream control operation.

In an example, synchronizing the display of a video stream at the plurality of viewing devices 105 may include determining an individual buffer length for each of the plurality of viewing devices based on respective network characteristics and refraining from displaying the video stream until a buffer for a viewing device 105A with the longest buffer length has reached a display threshold. In an example, the video stream may be provided by a third-party (e.g., an unaffiliated online content provider), and synchronizing the display of the video stream is completely coordinated by the plurality of viewing devices 105.

At operation 425, the environmental indication may be presented to each viewing device 105A in the plurality of viewing devices 105 that is not the at least one viewing device 105B. In an example, presenting the environmental indication may include presenting the at least one image in a picture-in-picture format. In an example, presenting the environmental indication may include super-imposing the at least one image onto the video stream. In an example, presenting the environmental indication that is the audible representation may include integrating the audible representation into an audio stream of the video stream.

Figure 5:
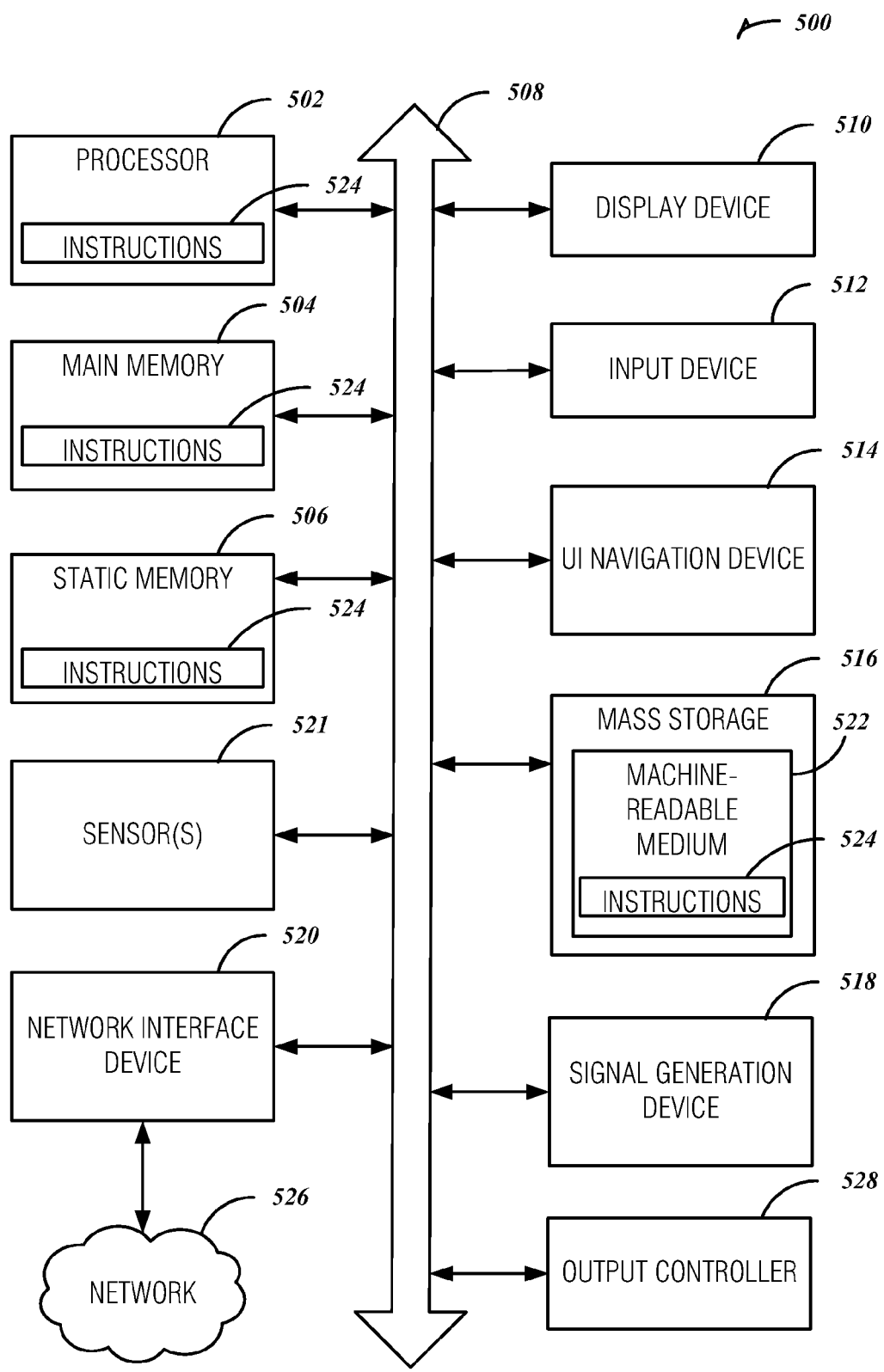
FIG. 5 is a block diagram illustrating an example machine upon which any one or more of the examples discussed herein may be implemented.

FIG. 5 illustrates a block diagram of an example machine 500 upon which any one or more of the examples (e.g., systems, techniques, methodologies, etc.) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via a link 508 (e.g., an interlink, bus, etc.). The machine 500 may further include a display unit 510, an alphanumeric input device 512 (e.g., a keyboard), and a user interface (UI) navigation device 511 (e.g., a mouse). In an example, the display unit 510, input device 517 and UI navigation device 914 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor

502 during execution thereof by the machine 500. In an example, one or any combination of the hardware processor 502, the main memory 504, the static memory 506, or the storage device 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524.

The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 may include subject matter (such as an apparatus, device, machine, or system) comprising a plurality of viewing devices, each of the plurality of viewing devices connected to a respective screen and configured to display images to the respective screen. Example 1 may also include an identification module configured to identify the plurality of viewing devices. Example 1 may also include an application control module configured to receive and apply an application control command received from a viewing device in the plurality of viewing devices. Example 1 may also include a synchronization module configured to synchronize display of a video stream at the plurality of viewing devices, the video stream including results of the application control command. Example 1 may also include an environmental impression module configured to receive an environmental indication from at least one viewing device in the plurality of viewing devices, and present the environmental indication to one or more viewing device in the plurality of viewing devices that are not the at least one viewing device.

In Example 2, the subject matter of Example 1 may optionally include, wherein the application control command is a selection of the video stream.

In Example 3, the subject matter of one or any of Examples 1-2 may optionally include, wherein the application control command is a video stream control operation, the video stream control operation selected from the group of play, pause, stop, rewind, skip-rewind, fast-forward, and skip fast-forward.

In Example 4, the subject matter of one or any of Examples 1-3 may optionally include, wherein the application control command is a video editing control operation.

In Example 5, the subject matter of one or any of Examples 1-4 may optionally include, wherein the environmental indication is at least one image representing the environment of the respective screen to the at least one viewing device.

In Example 6, the subject matter of Example 5 may optionally include, a camera communicatively coupled to the at least one viewing device and positioned to capture viewers of the respective screen, wherein the at least one image is derived from the camera.

In Example 7, the subject matter of one or any of Examples 5-6 may optionally include, wherein to present the environmental indication, the environmental impression module is configured to present the at least one image in a picture-in-picture format.

In Example 8, the subject matter of one or any of Examples 5-7 may optionally include, wherein to present the environmental indication, the environmental impression module is configured to super-impose the at least one image onto images derived from the video stream.

In Example 9, the subject matter of one or any of Examples 1-8 may optionally include, wherein the environmental indication is an audible representation of the environment of the respective screen to the at least one viewing device.

In Example 10, the subject matter of Example 9 may optionally include, wherein the environmental impression module is configured to integrate the audible representation into an audio stream of the video stream.

In Example 11, the subject matter of one or any of Examples 1-10 may optionally include, wherein to synchronize the display of a video stream at the plurality of viewing devices. The synchronization module may be configured to determine an individual buffer length for each of the plurality of viewing devices based on respective network characteristics, and control the plurality of viewing devices to refrain from displaying the video stream until a buffer for a viewing device with the longest buffer length has reached a display threshold.

In Example 12, the subject matter of one or any of Examples 1-11 may optionally include, wherein the video stream is provided by a third-party, and wherein the synchronization module completely resides on one or more of the plurality of viewing devices.

In Example 13, the subject matter of one or any of Examples 1-2 may optionally include, a network server including the synchronization module. The network server may be configured to receive the video stream provided by a third-party, and provide the video stream to the plurality of viewing devices.

Example 14 may include, or may optionally be combined with the subject matter of one or any combination of Examples 1-13 to include, subject matter (such as a method, means for performing acts, or machine-readable medium including instructions that, when performed by a machine cause the machine to performs acts) comprising identifying, using an identification module, a plurality of viewing devices configured to display images to respective screens, receiving, from a viewing device in the plurality of viewing devices, an application control command, receiving an environmental indication from at least one viewing device in the plurality of viewing devices, synchronizing display of a video stream at the plurality of viewing devices, the video stream including results of the application control command, and presenting the environmental indication to each viewing device in the plurality of viewing devices that is not the at least one viewing device.

In Example 15, the subject matter of Example 14 may optionally include, wherein the application control command is a selection of the video stream.

In Example 16, the subject matter of one or any of Examples 14-15 may optionally include, wherein the application control command is a video stream control operation, the video stream control operation selected from the group of play, pause, stop, rewind, skip-rewind, fast-forward, and skip fast-forward.

In Example 17, the subject matter of one or any of Examples 14-16 may optionally include, wherein the application control command is a video editing control operation.

In Example 18, the subject matter of one or any of Examples 14-17 may optionally include, wherein the environmental indication is at least one image representing the environment of the respective screen to the at least one viewing device. In Example 19, the subject matter of Example 18 may optionally include, wherein the at least one image is a derived from a camera positioned to capture viewers of the respective screen.

In Example 20, the subject matter of one or any of Examples 18-19 may optionally include, wherein presenting the environmental indication includes presenting the at least one image in a picture-in-picture format.

In Example 21, the subject matter of one or any of Examples 18-20 may optionally include, wherein presenting the environmental indication includes super-imposing the at least one image onto images derived from the video stream.

In Example 22, the subject matter of one or any of Examples 14-21 may optionally include, wherein the environmental indication is an audible representation of the environment of the respective screen to the at least one viewing device.

In Example 23, the subject matter of Example 22 may optionally include, wherein presenting the environmental indication includes integrating the audible representation into an audio stream of the video stream.

In Example 24, the subject matter of one or any of Examples 14-23 may optionally include, wherein synchronizing the display of a video stream at the plurality of viewing devices includes determining an individual buffer length for each of the plurality of viewing devices based on respective network characteristics and refraining from displaying the video stream until a buffer for a viewing device with the longest buffer length has reached a display threshold.

In Example 25, the subject matter of one or any of Examples 14-24 may optionally include, wherein the video stream is provided by a third-party, and synchronizing the display of the video stream is completely coordinated by the plurality of viewing devices.

In Example 26, the subject matter of one or any of Examples 14-25 may optionally include, wherein the video stream is provided by a third-party to a network server, and synchronizing the display of the video stream is coordinated by the network server to each of the plurality of viewing devices.

Example 27 may include, or may optionally be combined with the subject matter of one or any combination of Examples 1-26 to include, subject matter (such as a method, means for performing acts, or machine-readable medium including instructions that, when performed by a machine cause the machine to performs acts) comprising identifying a plurality of viewing devices configured to display images to respective screens, receiving, from a viewing device in the plurality of viewing devices, an application control command, receiving an environmental indication from at least one viewing device in the plurality of viewing devices, synchronizing display of a video stream at the plurality of viewing devices, the video stream including results of the application control command, presenting the environmental indication to each viewing device in the plurality of viewing devices that is not the at least one viewing device.

Example 28 may include, or may optionally be combined with the subject matter of one or any combination of Examples 1-27 to include, subject matter (such as an apparatus, device, viewing device, machine, or system) for a collaborative entertainment platform, connected to a screen and configured to display images on the screen, receive an application control command and communicate the application control command to an application control module, and present an environmental indication to the screen, the environmental indication presented by an environmental impression module.

In Example 29, the subject matter of Example 28 may optionally comprise the application control module, where the application control module configured to apply the application control command.

In Example 30, the subject matter of one or any of Examples 28-29 may optionally comprise the environmental impression module. The environmental impression module may be configured to receive an environmental indication from at least one viewing device in a plurality of viewing devices, the plurality of viewing devices including the viewing device, and present the environmental indication to one or more viewing device in the plurality of viewing devices that are not the at least one viewing device.

In Example 31, the subject matter of one or any of Examples 28-30 may optionally comprise an identification module configured to identify the plurality of viewing devices.

In Example 32, the subject matter of one or any of Examples 28-31 may optionally comprise a synchronization module, the synchronization module configured to synchronize display of a video stream at a plurality of viewing devices, the plurality of viewing devices including the viewing device, the video stream including results of the application control command.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the claimed subject matter should be determined with reference to the appended claims, along with the full scope of equivalents to which such claims are entitled.

What is claimed is:

1. A system for a collaborative entertainment platform, the system comprising:
   an identification module configured to identify a plurality of viewing devices, each of the plurality of viewing devices being connected to a respective screen and configured to display images to the respective screen;
   an application control module configured to:
      receive an application control command with respect to a video stream from a viewing device in the plurality of viewing devices; and
      apply the application control command;
   a synchronization module configured to synchronize display of the video stream at the plurality of viewing devices, the video stream including results of the application control command; and
   an environmental impression module configured to:
      receive an environmental indication from at least one viewing device in the plurality of viewing devices, the environmental indication being at least one of images, video, or sound captured at the location of the at least one viewing device; and
      present the environmental indication, to one or more viewing device in the plurality of viewing devices that are not the at least one viewing device, superimposed on the video stream.

2. The system of claim 1, wherein the application control command is a selection of the video stream.

3. The system of claim 1, wherein the application control command is a video stream control operation, the video stream control operation selected from the group of play, pause, stop, rewind, skip-rewind, fast-forward, and skip fast-forward.

4. The system of claim 1, wherein the application control command is a video editing control operation.

5. The system of claim 1, wherein the environmental indication includes at least one image representing the environment of the respective screen to the at least one viewing device.

6. The system of claim 5, comprising a camera communicatively coupled to the at least one viewing device and positioned to capture viewers of the respective screen, wherein the at least one image is derived from the camera.

7. The system of claim 5, wherein to present the environmental indication, the environmental impression module is configured to super-impose the at least one image onto images derived from the video stream.

8. The system of claim 1, wherein to synchronize the display of a video stream at the plurality of viewing devices, the synchronization module is configured to:
   determine an individual buffer length for each of the plurality of viewing devices based on respective network characteristics; and
   control the plurality of viewing devices to refrain from displaying the video stream until a buffer for a viewing device with the longest buffer length has reached a display threshold.

9. The system of claim 1, wherein the video stream is provided by a third-party, and wherein the synchronization module completely resides on one or more of the plurality of viewing devices.

10. A method for a collaborative entertainment platform, the method comprising:
   identifying, using an identification module, a plurality of viewing devices configured to display images to respective screens;
   receiving, from a viewing device in the plurality of viewing devices, an application control command with respect to a video stream;
   receiving an environmental indication from at least one viewing device in the plurality of viewing devices, the environmental indication being at least one of images, video, or sound captured at the location of the at least one viewing device;
   synchronizing display of a video stream at the plurality of viewing devices, the video stream including results of the application control command; and
   presenting the environmental indication, to each viewing device in the plurality of viewing devices that is not the at least one viewing device, superimposed on the video stream.

11. The method of claim 10, wherein the application control command is a video stream control operation, the video stream control operation selected from the group of play, pause, stop, rewind, skip-rewind, fast-forward, and skip fast-forward.

12. The method of claim 10, wherein the application control command is a video editing control operation.

13. The method of claim 10, wherein the environmental indication includes at least one image representing the environment of the respective screen to the at least one viewing device.

14. The method of claim 13, wherein the at least one image is a derived from a camera positioned to capture viewers of the respective screen.

15. The method of claim 13, wherein presenting the environmental indication includes presenting the at least one image in a picture-in-picture format.

16. The method of claim 10, wherein the environmental indication includes an audible representation of the environment of the respective screen to the at least one viewing device.

17. The method of claim 16, wherein presenting the environmental indication includes superimposing the audible representation into an audio stream of the video stream.

18. The method of claim 10, wherein synchronizing the display of a video stream at the plurality of viewing devices includes determining an individual buffer length for each of the plurality of viewing devices based on respective network characteristics and refraining from displaying the video stream until a buffer for a viewing device with the longest buffer length has reached a display threshold.

19. The method of claim 10, wherein the video stream is provided by a third-party, and synchronizing the display of the video stream is completely coordinated by the plurality of viewing devices.

20. A non-transitory machine-readable medium comprising a plurality of instructions that in response to being executed on a computing device, cause the computing device to perform operations comprising:
   identifying, using an identification module, a plurality of viewing devices configured to display images to respective screens;
   receiving, from a viewing device in the plurality of viewing devices, an application control command with respect to a video stream;
   receiving an environmental indication from at least one viewing device in the plurality of viewing devices, the environmental indication being at least one of images, video, or sound captured at the location of the at least one viewing device;
   synchronizing display of a video stream at the plurality of viewing devices, the video stream including results of the application control command; and
   presenting the environmental indication, to each viewing device in the plurality of viewing devices that is not the at least one viewing device, superimposed on the video stream.

21. A viewing device for a collaborative entertainment platform connected to a screen, the viewing device configured to:
   display images on the screen;
   receive an application control command with respect to a video stream;
   communicate the application control command to an application control module that is remote from the viewing device; and
   present an environmental indication, that is received from the application control module, to the screen, the environmental indication presented by an environmental impression module.

22. The viewing device of claim 21, wherein the application control module is configured to apply the application control command.

23. The viewing device of claim 21, wherein to present the environmental indication, the environmental impression module configured to:
   receive an environmental indication from at least one viewing device in a plurality of viewing devices, the plurality of viewing devices including the viewing device; and
   present the environmental indication to one or more viewing device in the plurality of viewing devices that are not the at least one viewing device.

24. The viewing device of claim 23, comprising an identification module configured to identify the plurality of viewing devices.

25. The viewing device of claim 21, comprising a synchronization module, the synchronization module configured to synchronize display of a video stream at a plurality of viewing devices, the plurality of viewing devices including the viewing device, the video stream including results of the application control command.

* * * * *